United States Patent [19]

Patsfall

[11] Patent Number: 4,934,583
[45] Date of Patent: Jun. 19, 1990

[54] APPARATUS FOR BONDING AN ARTICLE PROJECTION

[75] Inventor: Ralph E. Patsfall, Cincinnati, Ohio
[73] Assignee: General Electric Company, Cincinnati, Ohio
[21] Appl. No.: 365,384
[22] Filed: Jun. 13, 1989

Related U.S. Application Data

[62] Division of Ser. No. 173,791, Mar. 28, 1988, Pat. No. 4,883,216.

[51] Int. Cl.⁵ .............................................. B29F 1/03
[52] U.S. Cl. .................................... 228/44.3; 228/119
[58] Field of Search ................. 164/103, 338.1, 338.2; 228/119, 44.3, 238, 174, 161, 212

[56] References Cited

U.S. PATENT DOCUMENTS

| | | | |
|---|---|---|---|
| 2,152,528 | 3/1939 | Biggert | 164/338.1 |
| 2,892,224 | 6/1959 | Bauer | 164/338.1 |
| 4,079,911 | 3/1978 | Wirtz et al. | 164/338.1 |
| 4,832,254 | 5/1989 | Peuke et al. | 228/174 |
| 4,869,645 | 9/1989 | Verpoort | 164/103 |

FOREIGN PATENT DOCUMENTS

| | | | |
|---|---|---|---|
| 552149 | 4/1923 | France | 164/338.1 |
| 185549 | 10/1984 | Japan | 164/338.1 |

*Primary Examiner*—M. Jordan
*Attorney, Agent, or Firm*—Jerome C. Squillaro; Carmen S. Santa Maria

[57] ABSTRACT

A method for reparing or manufacturing an article, such as a bladed disk, having an integral projection, for example an airfoil, includes first removing a damaged projection to provide a stub, or in new manufacture providing the stub. A collar shaped to register with the stub is provided and bonded to the stub to generate a stub-collar combination. Then a replacement or new projection member is bonded to the stub-collar combination. Finishing then provides the article. Apparatus includes the combination of a metal attachment die and a heating means retained in a recess of the die during bonding.

6 Claims, 4 Drawing Sheets

APPARATUS FOR BONDING AN ARTICLE PROJECTION

This is a division of application Ser. No. 173,791, filed Mar. 28, 1988, now U.S. Pat. No. 4,883,216 on Nov. 28, 1989.

This invention relates to the bonding of an integral projection to a support and, more particularly, to the repair of a blading member airfoil integral with a support or hub.

BACKGROUND OF THE INVENTION

Historically, large rotating blading members or blades in relatively large turbine engines have been manufactured separately from a companion rotating member such as a hub (which herein generally is intended to include a blade support such as a drum, disk, shroud, etc.). The blades, which generally have hollow airfoils, were attached through a blade base, such as a dovetail type structure, secured or integral with an airfoil. To increase performance and to reduce manufacturing costs, technology has been developed to enable production of an integral airfoil and rotating member or hub. Sometimes this structure is referred to as a bladed disk or "blisk". One form of such a structure is shown in U.S. Pat. No. 4,573,876—Egan et al, issued Mar. 4, 1986.

Though manufacture of such articles has been expedited in this way, the problem of repair of damaged airfoils, either in manufacture or in turbine engine operation, must be addressed. With the use of distinct or separately manufactured and mechanically assembled blades and supporting structure, repair has included disassembly of the mechanically attached members, removal of the damaged blade and reassembly with a replacement blade. As is recognized in the art of repair of turbine engines, replacement of a damaged, integral airfoil in a blisk is significantly more complex.

SUMMARY OF THE INVENTION

It is a principal object of the present invention to provide an improved, practical and cost effective method for repairing a damaged projection, such as an airfoil, integral with and extending from a support, such as a hub.

Another object is to provide such a method which enables a sound metallurgical bond between a replacement airfoil and the associated portion of the hub or support.

Still another object is to provide a method for bonding a projection to a support, for example in the manufacture of an article.

These and other objects and advantages will be more fully understood from the following detailed description, embodiments and the drawings. All of these are intended to be typical of, rather than in any way limiting on, the scope of the present invention, represented by the appended claims.

Briefly, in one form, the present invention involves repairing an article, such as a metal blisk, comprising a support and an integral projection extending from the support, for example an airfoil extending from the hub of a blisk. The method includes removing a portion of the projection or airfoil to provide a projection stub connected to and extending away from the support, thereby providing a stub registry surface. In one form, the stub includes a stub top portion. To replace the removed portion, a collar is provided. The collar, which may be comprised of multiple mating parts depending upon the shape of the projection, includes an inner or contact surface, or surfaces, matched in shape with the stub registry surface, and a collar upper portion, or portions, later to become part of a first bonding interface with a replacement member. In one form, the collar upper portion cooperates with a stub top portion to provide such bonding interface. The stub registry surface and the collar contact surface are disposed in juxtaposition, with the collar upper portion remote from the support, and then are bonded together to provide a stub-collar combination. A replacement member, which includes a second bonding interface remote from a replacement projection, is disposed so that the first and second bonding interfaces are in juxtaposition. Then the replacement member and the stub-collar combination are bonded at the bonding interfaces.

In the form of the method of the invention for repairing an airfoil of a blisk, the collar and replacement member are substantially of the same material as is the stub. Excess material, for example upset, extruded or provided in the bonding process, or excess material in the collar, or both, can be removed as necessary. These kinds of finishing operations, which are well known and commonly practiced in the metallurgical joining arts such as friction welding, pressure bonding, diffusion bonding, upset welding, etc., include machining, grinding, benching, etc. to provide a manufactured or repaired article in a desired configuration. In the manufacture of new articles, as contrasted with the repair of new or used articles, the projection stub can be provided in a variety of ways including precision casting, machining, etc.

Apparatus of the present invention for bonding first and second metal members at a juncture between them comprises the combination of a metal attachment die for pressing the members together and a heating means retained in a recess of the die during bonding. In one form, the heating means is an induction heating coil assembly. It is particularly advantageous that the die be made of molybdenum or a molybdenum based alloy.

DESCRIPTION OF THE PREFERRED EMBODIMENTS

Figure 1:
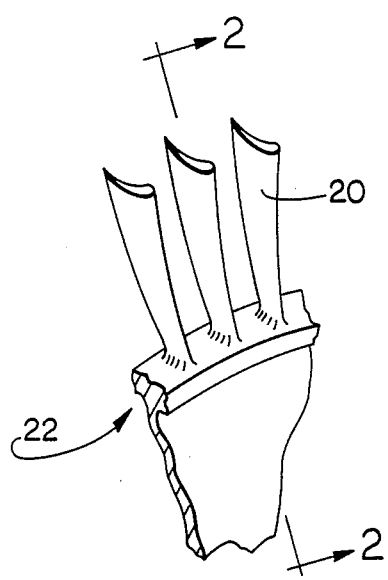
FIG. 1 is a fragmentary prospective view of a portion of a bladed disk or "blisk"
Figure 2:
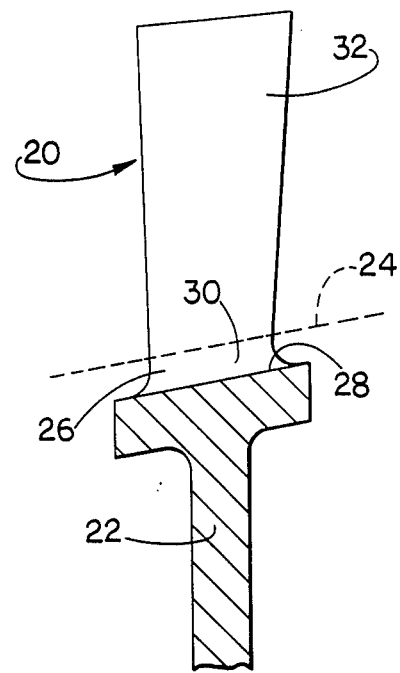
FIG. 2 is a section of the blisk of FIG. 1 along line 2—2.

The fragmentary perspective view of FIG. 1 and the sectional view of FIG. 2 present a bladed disk or "blisk" comprising a blading member or airfoil 20 as an integral projection from a support or hub 22. Damage can occur to the blading member, for example during its operation in power generating apparatus such as a turbine engine. In such event, the airfoil 20 must be repaired.

According to the present invention, projection or airfoil 20 is severed along a cut line 24, shown as a broken line in FIG. 2, to remove a damaged portion of the airfoil and to provide a projection or airfoil stub 26 connected to and integral with hub 22, for example in the vicinity of airflow surface 28. When the airfoil or projection 20 has a hollow portion, which frequently is the case with air cooled or weight reduced airfoils, cut line 24 is located in the solid portion 30 of the airfoil, radially inwardly from hollow portion 32. The stub 26 and adjacent, integral portion of the hub 22 is shown in the fragmentary, perspective view of FIG. 3.

Figure 3:
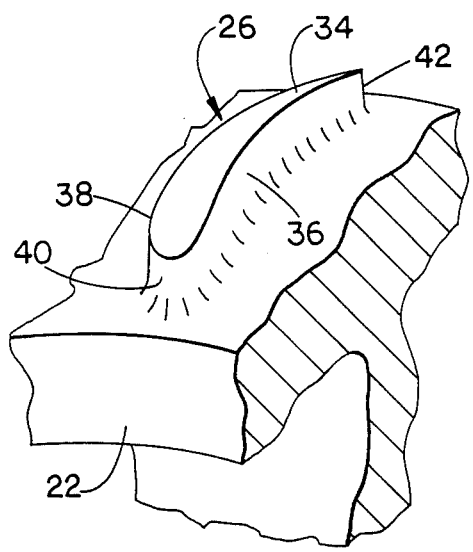
FIG. 3 is a fragmentary, perspective view of a portion of the member of FIG. 2.

In FIG. 3, stub 26 is shown to include a stub top portion 34, a first stub registry surface 36 and a second stub registry surface 38. The registry surfaces in FIG. 3 are shown to extend from the airfoil through the fillet area to the top of the hub. Registry surfaces 36 and 38 in this embodiment include airfoil leading edge portion 40 and airfoil trailing edge portion 42. It will be understood, however, that first and second registry surfaces can be considered to be a single registry surface in less complex configurations.

Figure 4:
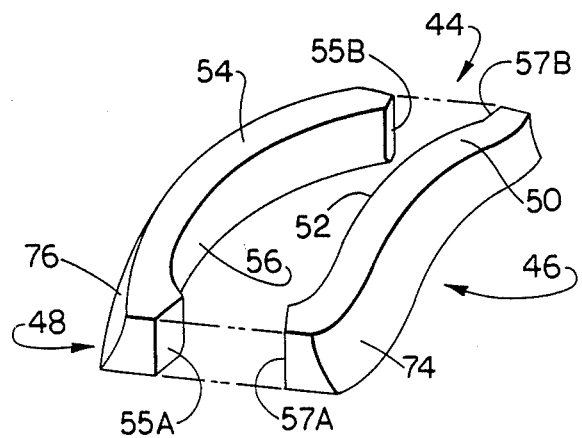
FIG. 4 is a perspective view of a pair of members comprising a collar for use with the member of FIG. 3.

Associated with the member of FIG. 3 in practice of the present invention is the collar shown generally at 44 in FIG. 4 and matched in shape with the shape of stub 26. As used herein, "matched in shape" is intended to mean shaped in accordance with a cooperating surface of the stub to enable assembly and bonding using appropriate bonding techniques and apparatus. In that embodiment, because of the relative complexity of the shape of stub 26, collar 44 is comprised of a first collar member 46 and a second collar member 48, shown in juxtaposition in FIG. 4 and shaped to cooperate with the member of FIG. 3 and with each other at directly opposed surfaces 55A and 57A and at surfaces 55B and 57B, as shown in FIG. 4. First collar member 46 includes a first collar upper portion 50, a first collar contact surface 52 and first collar outer surface 74. Second collar member 48 includes a second collar upper portion 54, a second collar contact surface 56 and second collar outer surface 76. In a more simple stub configuration, collar 44 can be a single member with a collar upper portion and a collar contact surface. Similarly, in even more complex shapes that that shown in FIGS. 1, 2 and 3, the collar can be comprised of more than two members, as necessary.

Figure 5:
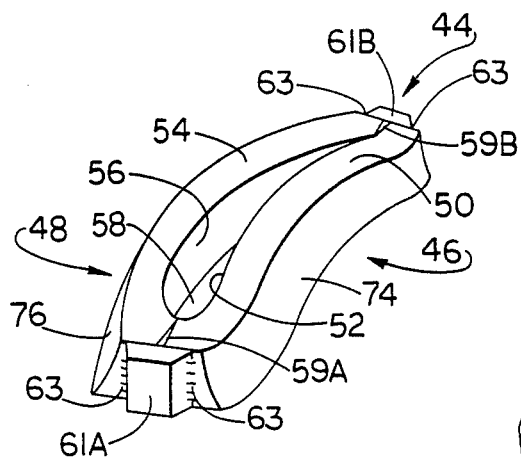
FIG. 5 is a perspective view of the assembly of the members of FIG. 4.

The perspective view of FIG. 5 shows the first and second collar members 46 and 48 of FIG. 4 assembled together to define therethrough a collar opening 58. However, when collar 44 is a single member, collar opening 58 may not exist and collar upper portions 50 and 54 can be a single, continuous surface. In that embodiment, collar 44 becomes a cap when assembled in registry with the stub, and the single continuous collar upper portion is the first interface surface now to be described in connection with FIG. 6. In the specific embodiment of FIG. 5, welds 59A and 59B were placed at the leading and trailing edge portions, respectively, and metal strops 61A and 61B were welded through fillet welds 63 at those areas, as shown, to reinforce and secure to each other members 46 and 48 in place during subsequent forming.

Figure 6:
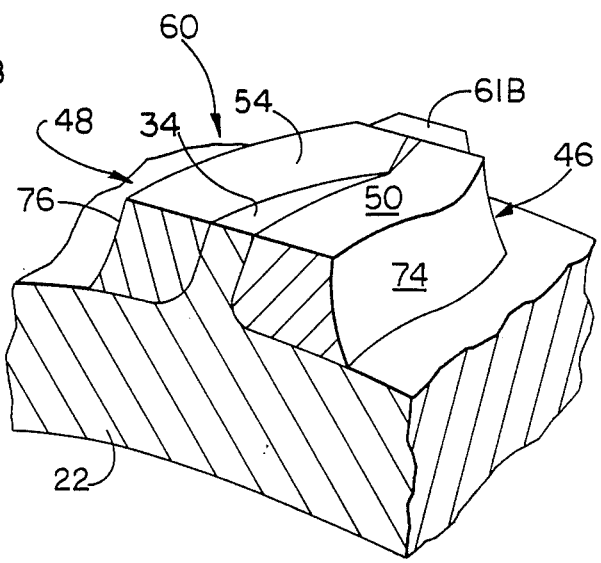
FIG. 6 is a fragmentary sectional view of the collar of FIGS. 4 and 5 assembled with the member of FIG. 3.

The assembly of collar 44 of FIGS. 4 and 5 about stub 26 in the member of FIG. 3 is shown in the fragmentary sectional view of FIG. 6. In that assembly, first collar contact surface 52 is in juxtapositions and generally is in contact with, first stub registry surface 36 with the shape of which it is matched. Also, second collar contact surface 56 is in juxtaposition, and generally is in contact with, second stub registry surface 38 with the shape of which it is matched. First and second collar upper portions 50 and 54, respectively, are positioned to be remote from the support or hub 22 and, in the embodiment of FIG. 6, are in general alignment with stub top portion 34 which projects through collar opening 58, FIG. 5. Together, collar upper portions 50 and 54 along with stub top portion 34 define a first interface shown generally at 60. Frequently, it is preferable for enhanced subsequent bonding that the material of collar 44 be substantially the same as, or at least compatible from a joining viewpoint with, the material of stub 26. As is shown in FIGS. 5 and 6, when assembled, collar 44 is configured to surround stub 26 at its registry surfaces 36 and 38, including portions of leading and trailing edges 40 and 42, respectively, FIG. 3. In addition, it has been beneficial to secure collar members 46 and 48 together at their directly opposed surfaces such as by welding, for example using metal straps 61A and 61B, as has been described.

Figure 7:
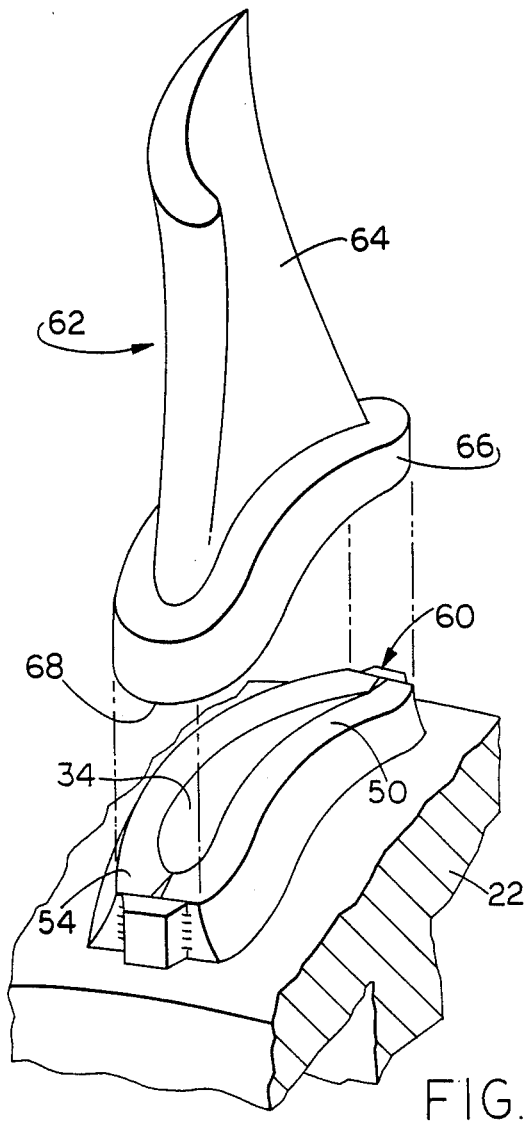
FIG. 7 is an exploded view of the assembly of FIG. 6 in juxtaposition with a replacement member.

After assembly of the collar and stub, the assembly is bonded together into a stub-collar combination, with a first bonding interface 60, FIGS. 6 and 7. After such bonding, there is provided a replacement member 62, shown in the exploded view of FIG. 7 to be in juxtaposition with the stub-collar combination. In that embodiment, replacement member 62 includes a replacement airfoil 64 and a bonding portion 66 from which airfoil 64 extends. Bonding portion 66 includes a second bonding interface 68 shown in juxtaposition with, and intended to cooperate with, first bonding interface 60, comprised of portions 34, 50 and 54 as has been described. Then the replacement member and the stub-collar combination are bonded together at the first and second bonding interfaces. Generally to enhance such bonding, the material of the bonding interface, and consequently generally the replacement member, is substantially the same as, or at least compatible with, the material of the stub-collar combination. As will be described later, it is convenient to bond metal members used in the practice of the present invention with metallurgical joining methods such as pressure bonding, friction welding, diffusion bonding, etc.

Figure 8:
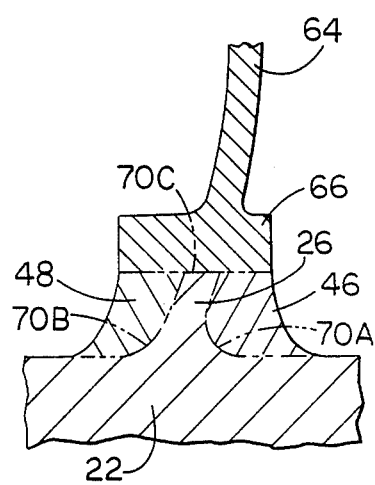
FIG. 8 is a fragmentary sectional view of the assembly of FIG. 7 bonded together.

The fully bonded structure or article preform, in one form of the method of the present invention, is shown in the fragmentary sectional view of FIG. 8 wherein bond lines, for example from diffusion bonding, are shown in phantom at 70A, 70B and 70C. As will be recognized, excess material in addition to that required to reconstruct the member shown in FIG. 1 generally is bonded into the structure. Therefore, finishing of the repaired article includes removing such excess material, such as by machining, grinding, benching, electrolytic or electrodischarge material removal, etc.

The above description of the method of the present invention has been described in connection with the repair and replacement of a projection such as an airfoil. However, the method can be used for initial manufacture of such articles. In such an embodiment, the hub and its projection stub can be provided initially such as by precision casting, by machining from stock, forgings or castings, by powder metallurgy techniques, etc., rather than by removing a portion of the projection to provide the stub.

Figure 9:
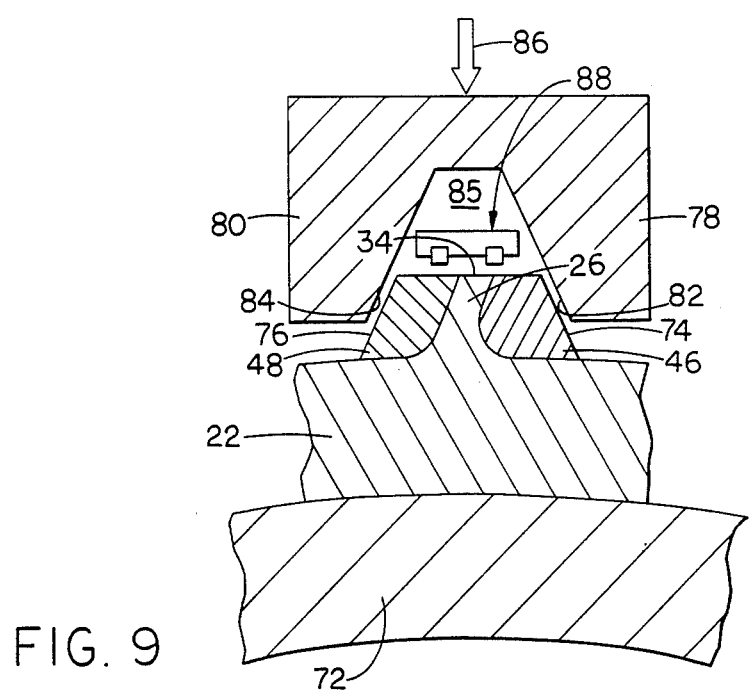
FIG. 9 is a partially sectional diagrammatic view of the assembly of FIG. 6 held by and in position with manufacturing tooling for bonding of the members.

Now with reference to the partially sectional diagrammatic view of FIG. 9, apparatus associated with the present invention is shown for bonding the collar to the stub to provide the stub-collar combination. In that figure, hub 22 with stub 26 is held by support tooling 72. First and second collar members 46 and 48 are assembled about stub 26 in the manner shown and described in connection with FIGS. 6 and 7. In the embodiment of FIG. 9, outer surfaces 74 and 76, respectively, of collar members 46 and 48 are inclined away from stub top portion 34, as shown. This enables cooperating first and second contoured collar attachment die portions 78 and 80, through their collar engaging surfaces 82 and 84, respectively, shaped to match with surfaces 74 and 76, upon application of force represented by arrow 86, to register with and press collar members 46 and 48 into registry and contact with stub registry surfaces 36 and 38, FIG. 3. Collar engaging surfaces 82 and 84 are a portion of a wall which defines a recess 85, all as shown in FIG. 9. The collar engaging surfaces are disposed at the open end of the recess; a heating means 88 is retained within the recess at its closed end, positioned adjacent the juncture of the collar contact surfaces and projection registry surfaces. First and Second die portions 78 and 80 are portions of a single die, as shown, with a relief or recess area about the heating means 88. Then the heating means such as induction heating coil assembly 88, positioned adjacent the collar and stub assembly can be left in place during subsequent bonding, or retracted prior to such operation. In the alternative, first and second die portions 78 and 80 can be separate, cooperating dies. The combination of heat from assembly 88 and a pressure welding force 86 diffusion bonds the collar members to the stub to provide a stub-collar combination bonded along bond lines 70A and 70B of FIG. 8. Under certain circumstances, though not generally, it may be helpful to apply a parting compound to collar engaging surfaces 82 and 84 to avoid bonding at those areas.

Figure 10:
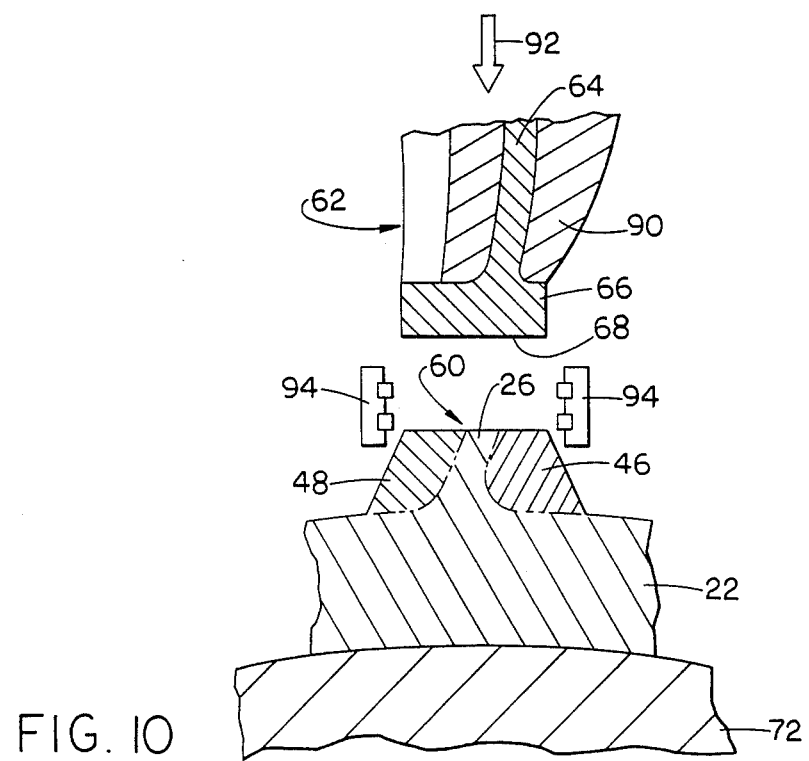
FIG. 10 is a partially sectional diagrammatic view of the product of FIG. 9 in position with a replacement member.

With reference to the partially sectional diagrammatic view of FIG. 10, after generation of the stub-collar combination, a replacement member 62 comprised of replacement airfoil 64 and bonding portion 66 is disposed in juxtaposition with the stub-collar combination. First bonding interface shown generally at 60 is opposite second bonding interface 68. The replacement member 62 is held by an airfoil holder 90 in cooperation with which a force 92, such as a force capable of upsetting the bonding interfaces for joining purposes, is applied while a heating means, such as induction heater assembly 94, is in operation. Although heater assembly 94 is shown outside of the space between interfaces 60 and 68, such heater assembly can be positioned between such interface for heating, and retracted prior to application of force 92 to engage such interfaces. As will be appreciated by those skilled in the art, the amount of force 86 and applied heat from assembly 88 in FIG. 9, and the amount of force 92 and applied heat from assembly 94 in FIG. 10 will vary with the materials being bonded as described.

Figure 11:
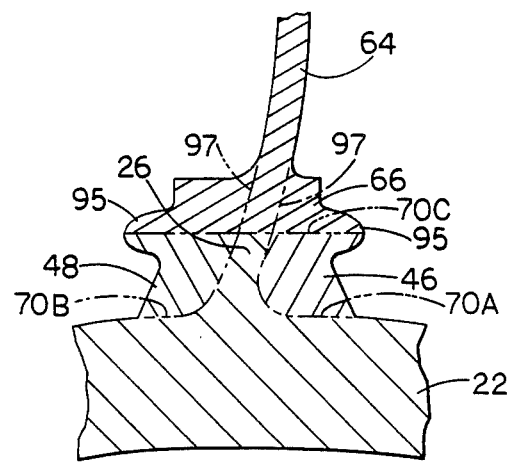
FIG. 11 is a fragmentary sectional view of a bonded repaired article before finishing.

After upset bonding of the replacement member to the stub-collar combination, in the embodiment described, the repaired article has an appearance shown in the fragmentary section view of FIG. 11 prior to finishing. Material 95 has been upset and expelled from the members during bonding to generate a bond generally along bond line 70C. As has been described above, excess material in collar members 46 and 48 and in replacement member bonding portion 66 is removed such as along broken line 97 by material removal methods and apparatus well known in the metallurgical art, to configure the article back to its original shape.

Figure 12:
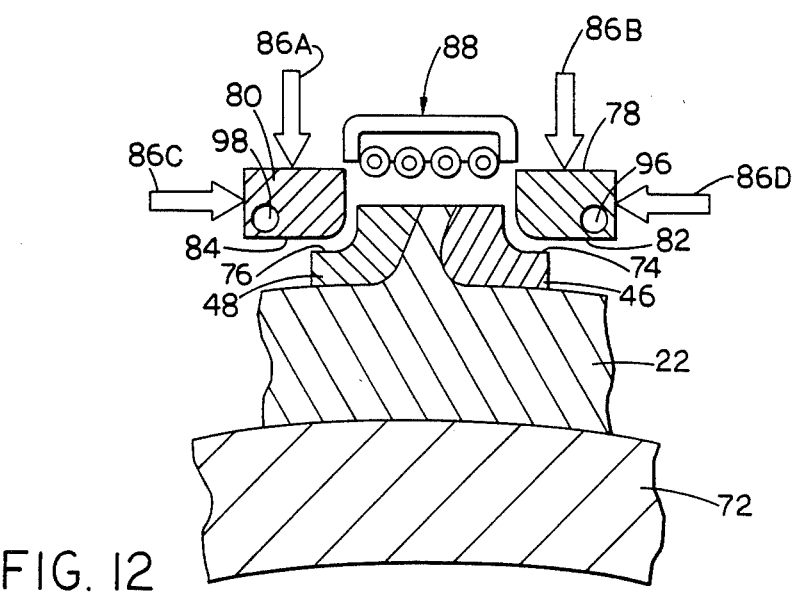
FIG. 12 is another embodiment of the tooling for bonding of the assembly of FIG. 6.

FIG. 12 is a partially sectional diagrammatic view of an alternate embodiment to the apparatus of FIG. 9, and showing the dies as separate tooling, with like reference numbers indicating like members. In the embodiment of FIG. 12, outer surfaces 74 and 76 respectively of collar members 46 and 48 are of a shape curved to receive and register with cooperating collar engaging surfaces 82 and 84 of contoured collar attachment dies 78 and 80. Dies 78 and 80 are cooled by cooling circulation cavities 96 and 98 which, when dies 78 and 80 are portions of a single die, can be a connected cooling cavity. In this embodiment, force is applied as shown by arrows 86A, 86B, 86C and 86D.

In one specific example of the present invention, the airfoil of a titanium alloy blisk, made of a commercially available alloy comprising 6 Al, 4V balance Ti was repaired by first removing the damaged airfoil in its solid portion by machining. This provided the stub 26, FIG. 3. First and second collar members 46 and 48, FIG. 4 and 5, of the same alloy were prepared as described above and assembled about the stub as shown in FIGS. 6 and 9. Molybdenum dies 78 and 80, in this example of a molybdenum alloy nominally by weight of 1% Hf, 0.05% C, balance Mo were appropriately shaped, and included insulation material commercially available as Fibersil material between the die and a pressure plate. The dies were forced into registry with collar members 46 and 48 with a force in the range of about 200–2000 pounds per square inch while an induction heater, positioned as shown in FIG. 9, heated the stub and collar members to a temperature in the range of about 1650°–1950° F. in a vacuum. The heat up time was about 20 minutes. A hold time of about 1–4 hours at temperature, with a cool down of about 6–10 hours, was used. This produced an upset of about 5–10%. The result was a stub-collar combination pressure welded along broken lines 70A and 70B of FIG. 8.

After preparation of the stub-collar combination, a replacement member of that same titanium alloy was provided and positioned as shown in FIG. 10, with induction heating coil assembly 94 positioned about the intended bond area between the replacement member and the stub-collar combination and their bond interfaces. A low upset force 92 in the range of about 30,000–35,000 pounds per square inch was applied to the replacement member 62 in its holder 90 which was made of tool steel material. Pressure from force 92 pressed the replacement member toward and in contact with the stub-collar combination at the first and second bonding interfaces 60 and 68, while heating means 94, a water cooled induction heater, heated the interface area to a temperature in the range of about 1850°–2050° F. in vacuum. This combination resulted in an 80–85% upset of the alloy in that region and expulsion of material as shown at 95 in FIG. 11. A bond between the replacement member and the stub-collar combination was created as shown by broken line 70C in FIG. 11.

This invention has been described in connection with specific examples and embodiments. However, it will be understood by those skilled in the arts involved that the invention is capable of a variety of other forms and embodiments within the scope of the appended claims.

What is claimed is:

1. In apparatus for metallurgically bonding a first metal member and a second metal member at a juncture between them, at least one of the members having an outer die engaging surface remote from the juncture, the combination of:
    a metal attachment die which includes a wall defining a die recess having a closed end and an open end for disposition about the first and second members, at least a portion of the wall at the open end having a member engaging surface shaped to engage a member outer surface for pressing the members together at the juncture between them; and
    a heating means retained during bonding in the closed end of the die recess and positioned adjacent the juncture during bonding.

2. The apparatus of claim 1 in which the heating means in an induction heating coil assembly.

3. The apparatus of claim 1 in which the metal attachment die is made of a metal selected from the group consisting of molybdenum and molybdenum-based alloys.

4. In apparatus for metallurgically bonding a metal collar to and about a metal projection connected to and extending from a support, the projection having a top portion remote from the support and a projection registry surface extending between the support and the top portion, the collar including a collar contact surface disposed in juxtaposition with and at a juncture between the projection registry surface and including a collar outer surface inclined away from the projection top portion toward the support, the combination of:
    a metal collar attachment die which includes a wall defining a die recess having a closed end, and an open end for disposition about the collar, at least a portion of the wall at the open end being a collar engaging surface shaped to engage the collar outer surface for pressing the collar toward the projection; and
    a heating means retained in the closed end of the die recess during metallurgical bonding, the heating means positioned to be adjacent the juncture between the collar contact surface and the projection registry surface at the projection top portion during bonding.

5. The apparatus of claim 4 in which the heating means is an induction heating coil assembly.

6. The apparatus of claim 4 in which the metal collar attachment die is made of a metal selected from the group consisting of molybdenum and molybdenum-based alloys.

* * * * *